United States Patent [19]

Drueck, Jr.

[11] Patent Number: 4,738,041

[45] Date of Patent: Apr. 19, 1988

[54] PICTURE DISPLAY DEVICE AND STAND

[76] Inventor: Fred Drueck, Jr., 4941 W. Henderson, Chicago, Ill. 60641

[21] Appl. No.: 857,106

[22] Filed: Apr. 29, 1986

[51] Int. Cl.[4] .......................... G09F 1/12; A47G 1/06; F16M 13/00

[52] U.S. Cl. ...................................... 40/155; 40/152.1; 40/156; 40/606; 40/607; 40/610; 40/611; 248/524

[58] Field of Search ....................... 40/152.1, 155, 156, 40/160, 606, 607, 610, 611, 154; 248/524, 528; 229/160

[56] References Cited

U.S. PATENT DOCUMENTS

| | | | |
|---|---|---|---|
| 1,472,355 | 10/1923 | Dietsche, Jr. | 40/155 |
| 1,503,516 | 8/1924 | Porter | 229/160 |
| 2,376,180 | 5/1945 | Paige | 40/152.1 |
| 2,408,532 | 10/1946 | Roach | 40/155 |
| 2,439,022 | 4/1948 | Roach | 40/155 |
| 2,550,926 | 5/1951 | Hery | 40/152.1 |
| 2,568,899 | 9/1951 | Ramlow | 40/155 |
| 2,762,148 | 9/1956 | Alcaraz | 40/155 |
| 2,771,260 | 11/1956 | Thom | 248/524 |
| 2,788,596 | 4/1957 | Schwartz | 40/152.1 |
| 2,814,896 | 12/1957 | Fujikawa | 40/155 |
| 2,851,208 | 9/1958 | Sansing | 40/155 |
| 2,882,629 | 4/1959 | Moebius | 40/610 |
| 2,939,236 | 6/1960 | Stein | 40/610 |
| 2,950,556 | 8/1960 | Larios | 40/154 |
| 3,214,855 | 11/1965 | Winkler et al. | 40/154 |
| 3,286,387 | 11/1966 | Poertner | 40/154 |
| 3,350,804 | 11/1967 | Guyer, Jr. et al. | 40/610 |
| 3,765,598 | 10/1973 | Rosenburg, Jr. | 40/154 |
| 4,570,844 | 2/1986 | Wysocki | 229/160 |

FOREIGN PATENT DOCUMENTS

| | | | |
|---|---|---|---|
| 909096 | 4/1946 | France | 40/155 |

*Primary Examiner*—Carl D. Friedman
*Assistant Examiner*—Michael Safavi
*Attorney, Agent, or Firm*—Knechtel & Demeur

[57] ABSTRACT

A display device having a collapsible display board which removably receives pictures which are intended to be displayed. The display board can have affixed to its back a support receiving means, the receiving means further being collapsible. In one mode the receiving means receives a supporting pole member which is itself supported by a polyhedral base such that a free standing display board is formed. The polyhedral base is collapsible into a substantially flat configuration for storage. In a second configuration, the support receiving means receives an L-shaped supporting bracket which can support the display board in its display mode on a flat surface such as a countertop or desk. This bracket is further collapsible for storage. Thus, by utilizing either of the supporting structures, the display board can be supported in either the free standing mode above the polyhedral base or can be adapted for mounting on a countertop display surface. Furthermore, as all parts can be manufactured from carboard, paperboard or similar materials, it is lightweight, easy to carry, inexpensive to manufacture, yet has sufficient structural strength for its intended purpose.

4 Claims, 5 Drawing Sheets

PICTURE DISPLAY DEVICE AND STAND

BACKGROUND AND SUMMARY OF THE INVENTION

This invention relates to display devices and more particularly to an improved display board and stand therefor.

In particular, the display device of the present invention includes a display board which is formed from an integral sheet of paperboard material which is cut and scored to form a central display portion which has along each edge thereof a foldable flap. These foldable flaps are scored to permit the flaps to be folded over and atop one side of the central display portion to form a frame about the central display portion. The frame is generally triangular in cross-section and forms with the central display portion a groove into which a picture, poster or the like (hereinafter the picture) can be inserted such that the picture is supported about at least three of its sides against the central display portion and also is framed by the frame. The foldable flaps also are formed with a pair of slots in them, each of which lockingly engages with one of the pair of slots in an adjacent one of the foldable flaps, such that the foldable flaps are lockingly secured together to form the frame. The need for adhesively or otherwise securing the foldable flaps to one another or to the display board is therefore eliminated. The central display portion further is provided within a slot through which the picture can be easily removed from or inserted into the groove formed between the frame and the central display portion, so that the picture can be easily and quickly changed. The display board being formed from an integral sheet of paperboard material can be shipped flat and subsequently assembled for use, and after being assembled can be easily dis-assembled into a flat configuration for storage.

Display devices of the prior art also were particularly designed for use in displaying a picture on a display board which was supported from a stationary display stand. The display board was generally supported above the stand by means of a pole support or was independently supported by means of legs generally in the configuration of a tripod. The tripod type was commonly referred to as an easel and very often the legs were foldable or collapsible for storage.

Other display devices were designed with the display board supported on a flat display surface such as a countertop or desk. The display board was generally supported by means of a rear bracket.

These prior display devices were not adapted for display in both of the above-described display modes. That is, the display board could not be placed on a surface in one configuration and then mounted above a supporting structure in a second configuration. Accordingly, the prior display devices were not capable of display in either of two configurations and further were not capable of being collapsed for storage and transporting.

The improved display board in addition to having the above-described improved features also is capable of displaying a picture in either of the above two-mentioned configurations. According to one aspect of the invention the display board is mounted on a supporting pole member which is further supported by a base supporting structure, the entire display device being foldable and collapsible into a substantially flat configuration for shipment or storage. In another aspect of the invention, the display board is adapted for mounting on a display surface such as a desk or a countertop while not requiring the supporting pole member or supporting base structure. Thus, the improved display board is adapted for display in either of the two modes and is collapsible. Furthermore, the inventive structure is capable of manufacture from cardboard or similar materials which are inexpensive, light and can be easily assembled at the location where the display device is to be used.

According to the specific embodiments illustrated in the drawings of this application and discussed in detail below, the improved display device has a collapsible display board which removably receives pictures which are intended to be displayed. The display board can have affixed to its back a support receiving means, the receiving means further being collapsible. In one mode the receiving means receives a supporting pole member which is itself supported by a polyhedral base such that a free standing display board is formed. The polyhedral base is collapsible into a substantially flat configuration for storage. In a second configuration, the support receiving means receives an L-shaped supporting bracket which can support the display board in its display mode on a flat surface such as a countertop or desk. This bracket is further collapsible for storage. Thus, by utilizing either of the supporting structures, the display board can be supported in either the free standing mode above the polyhedral base or can be adapted for mounting on a countertop display surface. Furthermore, as all parts can be manufactured from cardboard, paperboard or similar materials, it is light-weight, easy to carry, inexpensive to manufacture, yet has sufficient structural strength for its intended purpose.

Many other objects and advantages of the invention will be clear for the following detailed description of the drawings.

DESCRIPTION OF THE PREFERRED EMBODIMENTS

Figure 2:
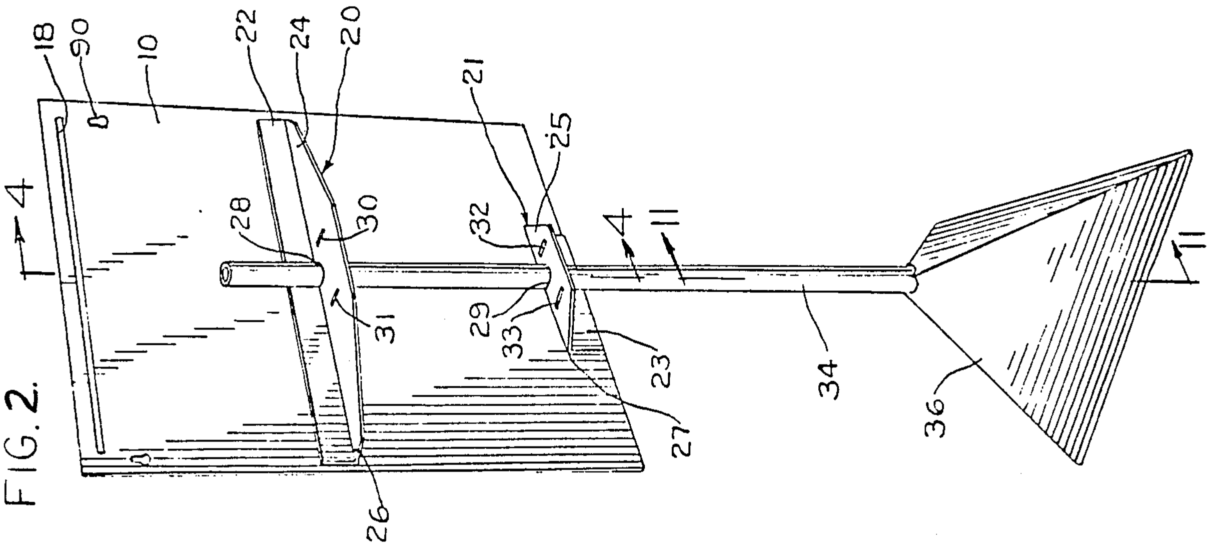
FIG. 2 is a perspective view of the rear view of the display device of FIG. 1.
Figure 1:
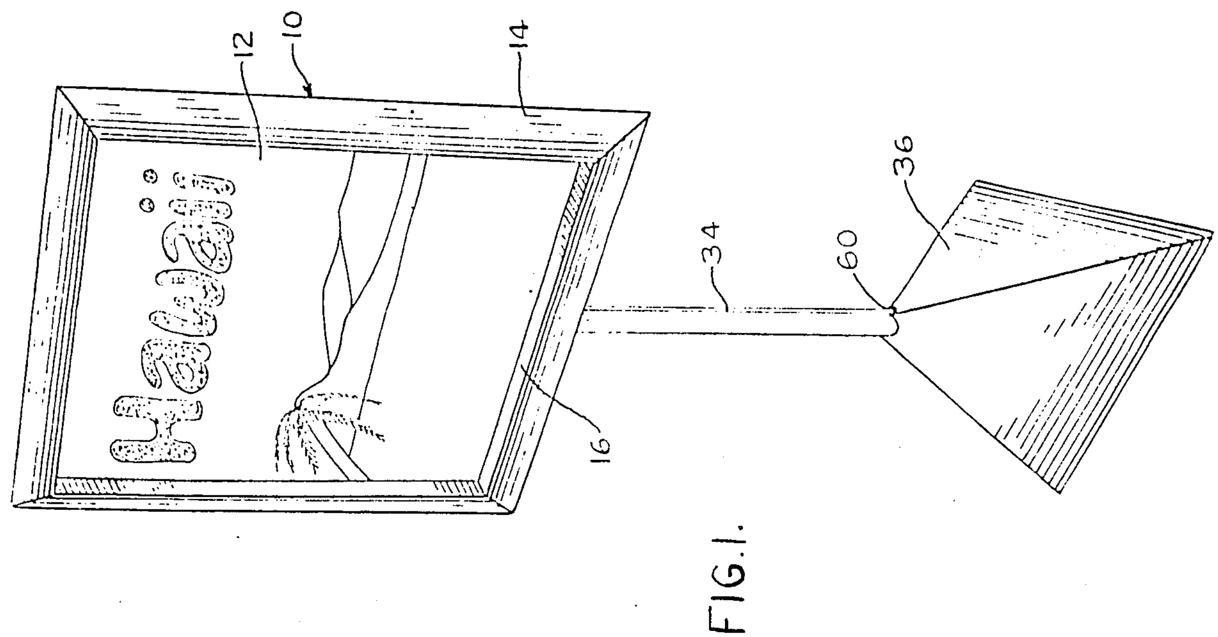
FIG. 1 is a perspective view of the improved display device in its free standing display mode.

Turning first to FIGS. 1 and 2, there is illustrated the inventive collapsible display device in one of its display configurations. There is a display board 10 on which is displayed a poster or other sheet of material (hereinafter the picture 12) which is to be displayed. The display board 10 has a border frame 14 which is generally triangular in cross-section having a surrounding shelf 16 to give depth to the picture 12. As seen in FIG. 2, the rear of the display board 10 has a picture slot 18 through which the picture 12 is slipped into its display position, as more fully described below.

On the back of the display board 10 is placed two L-shaped receiving brackets 20, 21 each having one leg 22, 23 affixed to the back of the display board 10. The other legs of the L-shpaed bracket 24, 25 are free to pivot along score lines 26, 27, respectively, which join the legs of the L-shaped brackets 20, 21. The L-shaped receiving brackets 20, 21 constitute the means to receive supporting structures which will support the display board 10 in either of two modes.

In a first mode of display, which is illustrated in FIGS. 1 and 2, the L-shaped receiving brackets 20, 21 have holes 28, 29 placed in the legs 24, 25. The hole 28 is slightly smaller than the hole 29 for reasons which will be described below. There also are placed a parallel set of slots 30, 31 in the leg 24 and a similar set of slots 32, 33 in leg 25.

Figure 4:
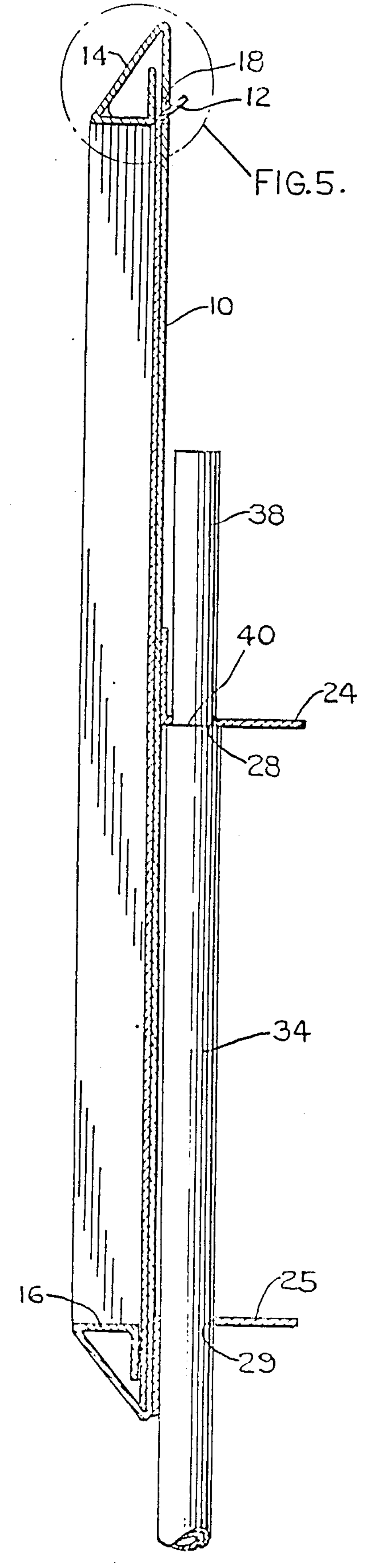
FIG. 4 is a cross-sectional view of the display device with portions removed taken along lines 4—4 of FIG. 1.
Figure 6:
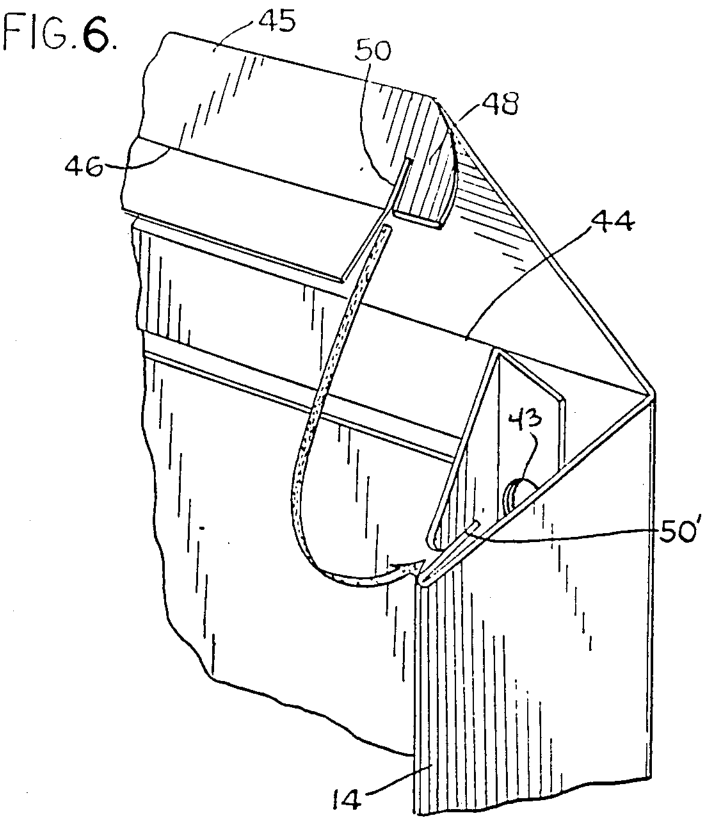
FIG. 6 is a perspective view with portions removed of one corner of the diplay board in its assembled configuration.

The holes 28, 29 receive a pole 34 which is itself supported by a polyhedral base 36. The pole has a reduced diameter top portion 38 which forms a shoulder 40 (FIG. 4). The diameter of the reduced top portion 38 is slightly less than the diameter of either of the holes 28, 29. The diameter of the shoulder 40 is slightly larger than the hole 28 but is slightly less than the diameter of the hole 29 such that the pole 34 can pass upward through hole 29. The shoulder 40 will not pass through hole 28 but instead will support the leg 24 of the L-shaped bracket 20 as the leg rests on the shoulder 40.

Figure 5:
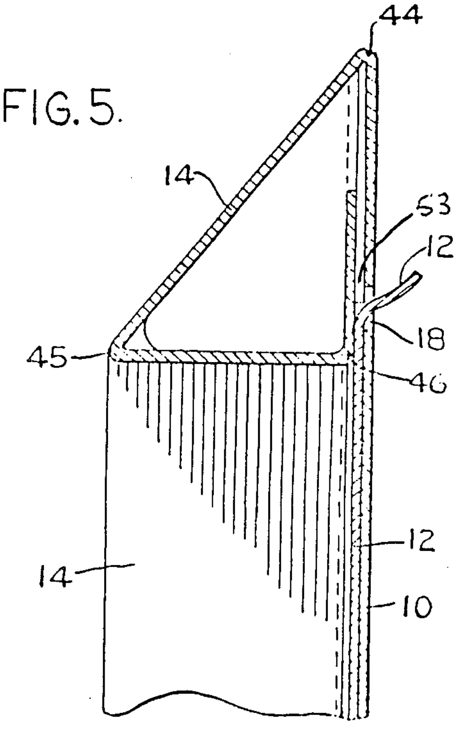
FIG. 5 is an enlarged view with portions removed of the area of the display board indicated in the enclosed circle of FIG. 4, generally illustrating how the foldable flaps are lockingly engaged with one another to form the frame.
Figure 7:
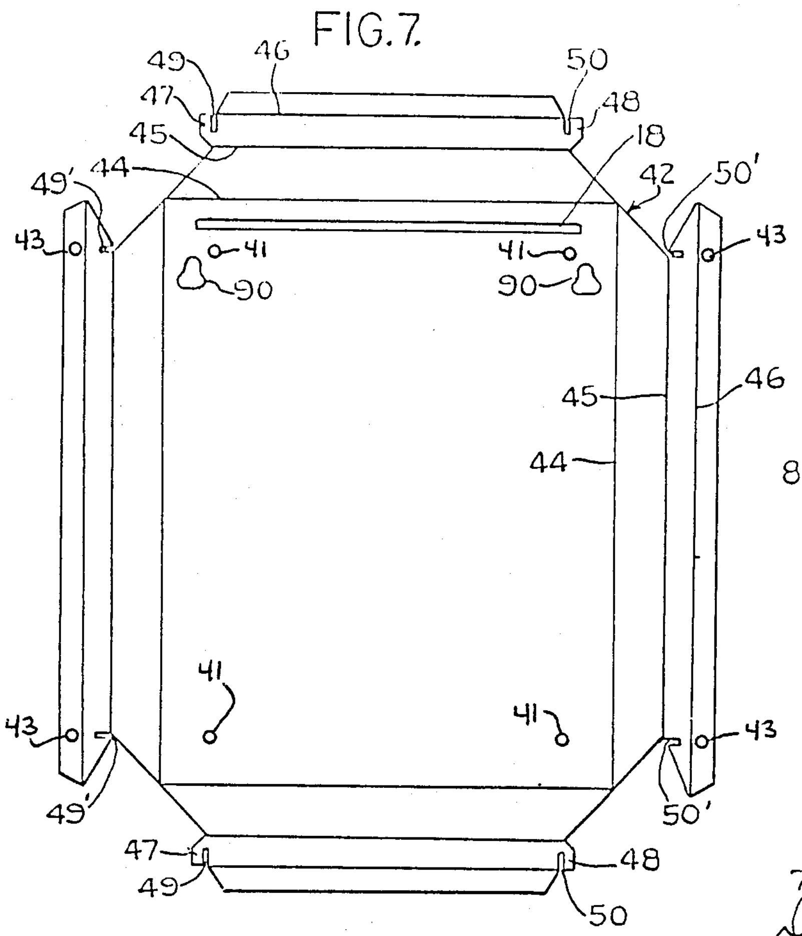
FIG. 7 is a plan view of the cardboard blank from which the display board is formed.

The construction of the frame 14 of the display board 10 is most clearly seen in FIGS. 4 through 7. It can be seen that the display board 10 and frame 14 are manufactured from a blank 42 (FIG. 7). There are three score lines 44, 45 and 46, which are on each side of the blank 42. As seen in FIG. 5, with the sides of the blank folded along the score lines 44, 45 and 46, the frame 14 is formed atop and about the perimeter of the display board 10 and is generally triangular in cross-section. The flaps which form the frame 14 are lockingly engaged together by means of a set of tabs 47, 48 placed on opposite sides of the flaps which form the frame 14, and a set of slots 49, 50, which mate with their corresponding respective slots 49' and 50'. As can be best seen in FIG. 6 when the flaps are folded to form the frame 14, the tabs 47, 48 must be folded and tucked behind the formed frame in order to engage the slots 49, 50, 49' and 50'. Once the slots are engaged, the tabs 47, 48 are effectively locked behind and interiorly of the frame 14 and retain the flaps folded to form the frame 14. Thus, the entire frame 14 can be folded into the desired configuration and is securely retained as an integral unit without the necessity of adhesively or otherwise securing the folded flaps to the display board. This permits the frame to again be opened by merely sliding the slots and tabs out of engagement and unfolding the flaps to assume the flat condition of the blank 42 for storage or transportation. To assist in opening the frame, holes 41 and 43 are formed in the display board 10 and in the flaps on each of its opposite sides and are positioned such that the holes 41, 43 on each of the opposite corners mate with one another when the flaps are folded to form the frame. These holes 41, 43 then provide finger holes through which a finger can be extended to releasably disengage the tabs 47, 48 from behind the formed frame so that the frame can be easily opened. As important, is the fact that by forming the frame in this fashion, the frame 14 is effectively free-standing and forms with the display board a picture receiving slot 53 between the frame 14 and the front of the display board 10, about its entire perimeter, into which the picture to be displayed is slidably received and retained. The picture therefore not only is framed but is held flat on the display board without the need of additional fastening means.

As seen in FIG. 5, the picture 12 is slidably extended into the picture slot 53 through the poster slot 18 at the back of the display board 10. The picture 12 also extends slightly out from the picture slot 18 so that it can be easily withdrawn and replaced. This provides for easy changing of the display pictures.

Figure 9:
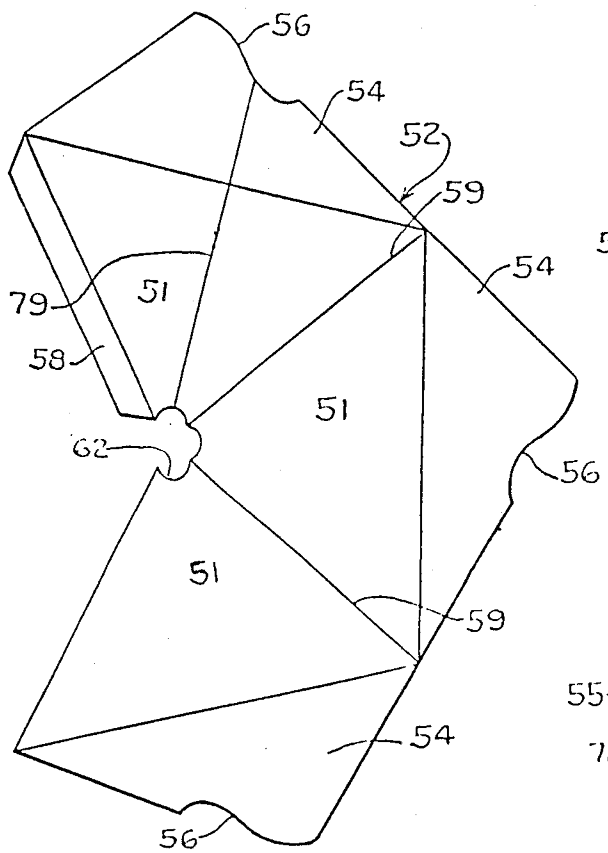
FIG. 9 is a plan view of the cardboard blank of one configuration of the polyhedral base structure.
Figure 12:
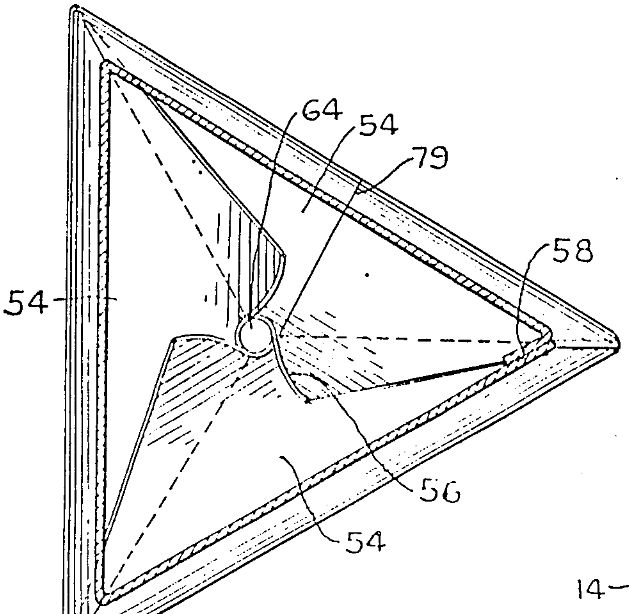
FIG. 12 is a cross-sectional view taken along lines 12—12 of FIG. 11.
Figure 13:
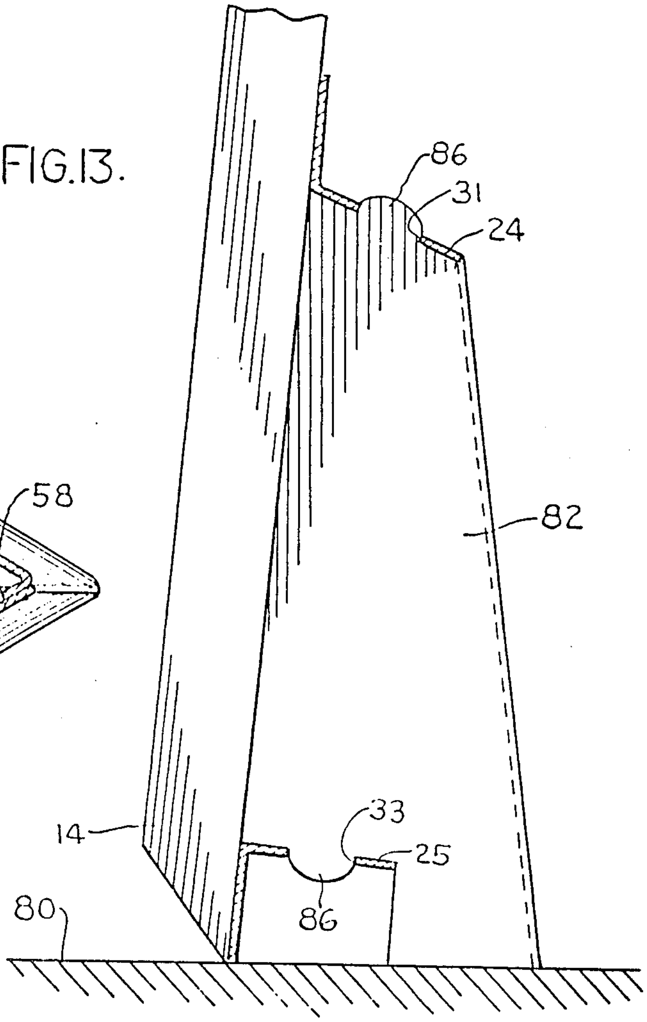
FIG. 13 is a cross-sectional view taken along lines 13—13 of FIG. 3.

The polyhedral base 36, which is used to support the pole member 34, can take any one of several configurations. One such configuration is a polyhedron having three sides 51 and a base which are formed from a blank 52 illustrated in FIG. 9. The blank 52 is seen to have three bottom panels 54 each having a scalloped end 56. There additionally is a flap 58 which extends from one of the sides 51 and is glued to one of the other sides as seen in FIG. 12 to form the triangular base 36. The other sides 51 are joined together by score lines 59. A centrally disposed opening 60 is at the top of the base 36. When viewing the blank 52 it can be seen that the centrally disposed opening 60 is formed by a series of three cut-outs 62 each being semi-circular in configuration such that when the flap 58 is secured to the side 51, a circular opening at the top of the base 36 is formed. When the base 36 is formed, the scalloped ends 56 come together in a central location to form a centrally disposed hole 64 which can best be seen in FIG. 12.

Figure 14:
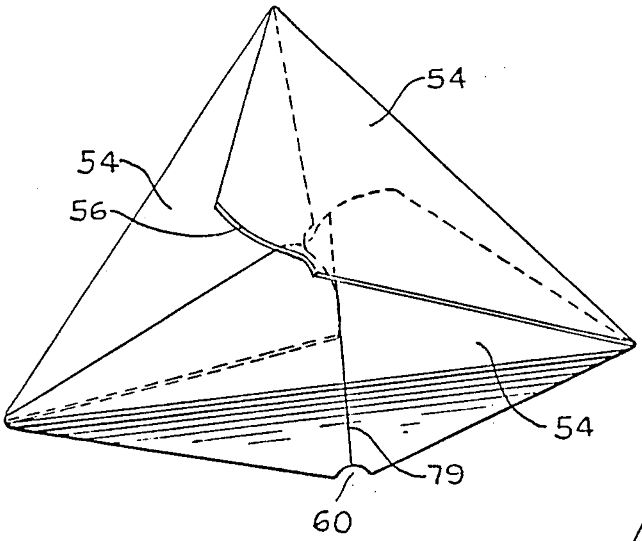
FIG. 14 is a bottom perspective view of the polyhedral base made from the blank of FIG. 9 in its partially assembled mode.
Figure 15:
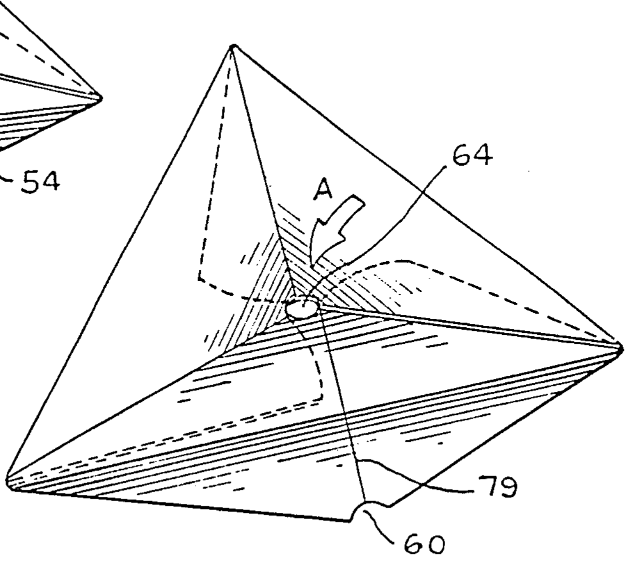
FIG. 15 is a bottom perspective view of the polyhedral base of FIG. 14 after the base is in its assembled mode.

As seen in FIGS. 14 and 15, the polyhedral base 36 is formed by interleaving the bottom panels 54 one on top of the other. The panel 54 which has the exposed scalloped end is then pushed inward in the direction of the arrow A in FIG. 15, resulting in the scalloped ends 56 all being disposed internally of the base 36.

The pole 34 must be inserted through the bottom of the base 36, by inserting the reduced diameter end 38 of the pole 34 through the centrally disposed hole 64, so that it emerges through the centrally disposed opening 60. Pole 34 has a bottom reduced diameter portion 66 having a shoulder 68. After the body of the pole 34 has passed through the centrally disposed hole 64 further insertion is stopped. The pole 34 is now locked in position by resting against the scalloped ends 56 which form the centrally disposed hole 64. Downward pressure applied against the pole 34 further tightens the grip of the scalloped ends 56 around the bottom reduced portion 66 and shoulder 68 due to the triangular configuration of the walls of the base 36 and the triangular configuration of the bottom panels forming a bracing structure against the pole 34.

Figure 10:
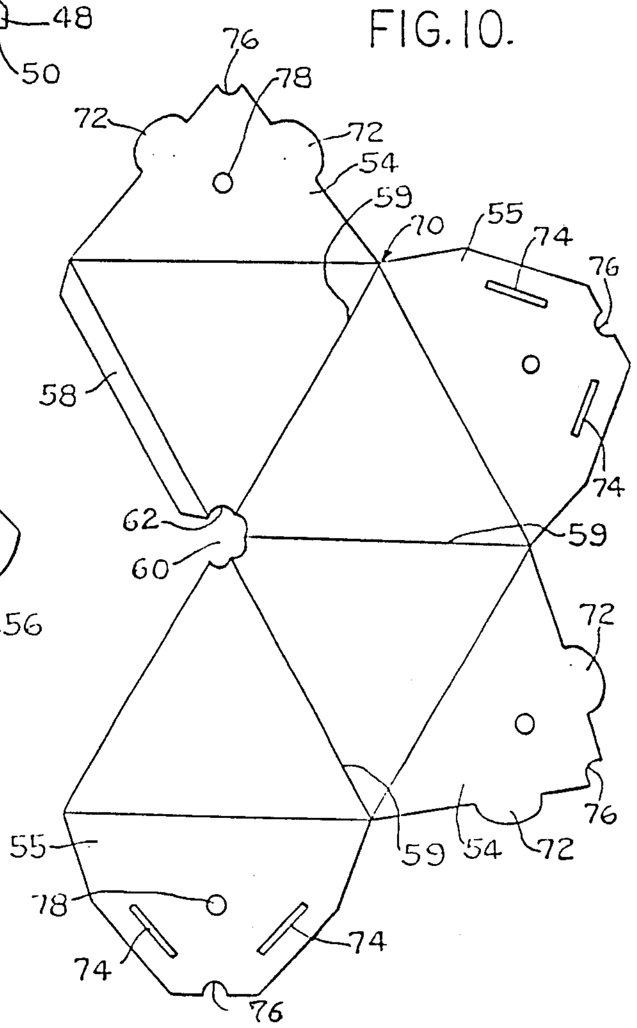
FIG. 10 is a plan view of a cardboard blank from which an alternate polyhedral base structure is constructed.
Figure 16:
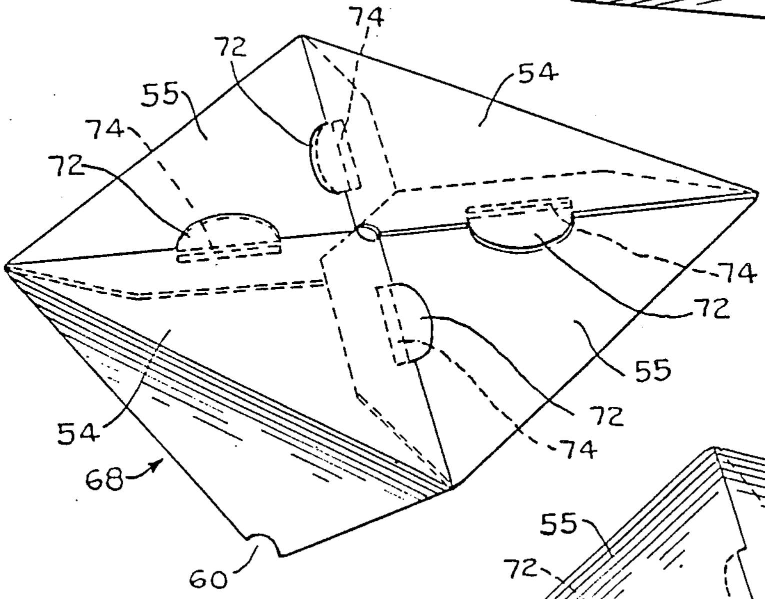
FIG. 16 is a bottom perspective view of the base of FIG. 10 in its partially assembled mode.
Figure 17:
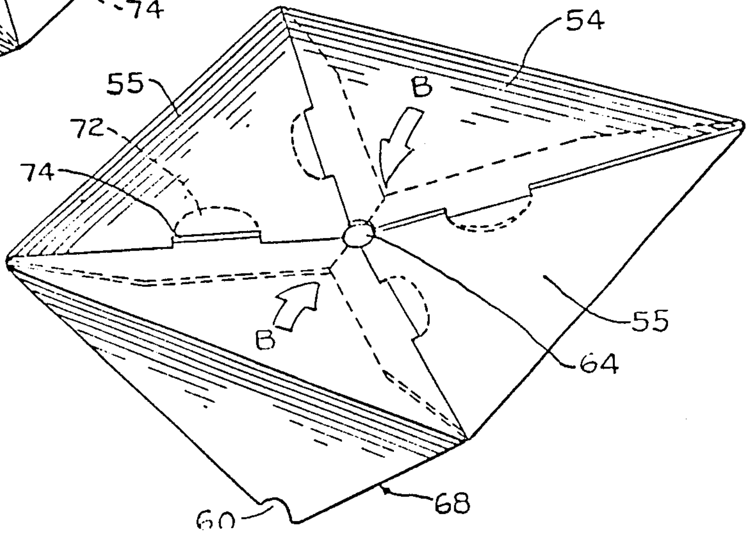
FIG. 17 is a bottom perspective view of the blank of FIG. 16 after final assembly.

An alternate polyhedral base 68 in the shape of a pyramid is illustrated in FIGS. 10, 16 and 17. FIG. 10 shows a blank 70 from which the pyramid is formed. Wherever possible, identical numbers have been used to designate corresponding portions of the blanks 52 to the blank 70. Thus, where identical numerals are used, it can be assumed that the elements operate the same as in the polyhedral base 36. However, there are certain differences in construction which will now be described. The bottom panels 54 are seen to have tabs 72 extending from their sides. There are two other bottom panels 55 which have receiving slots 74 to receive the tabs 72. In lieu of scalloped ends 56, there are semi-circular cutouts 76 which form the centrally disposed hole 64. Additionally, there are finger holes 78 to aid the user in constructing the polyhedral base 68 by giving him a more secure grasp of the bottom panels 54, 55.

Figure 11:
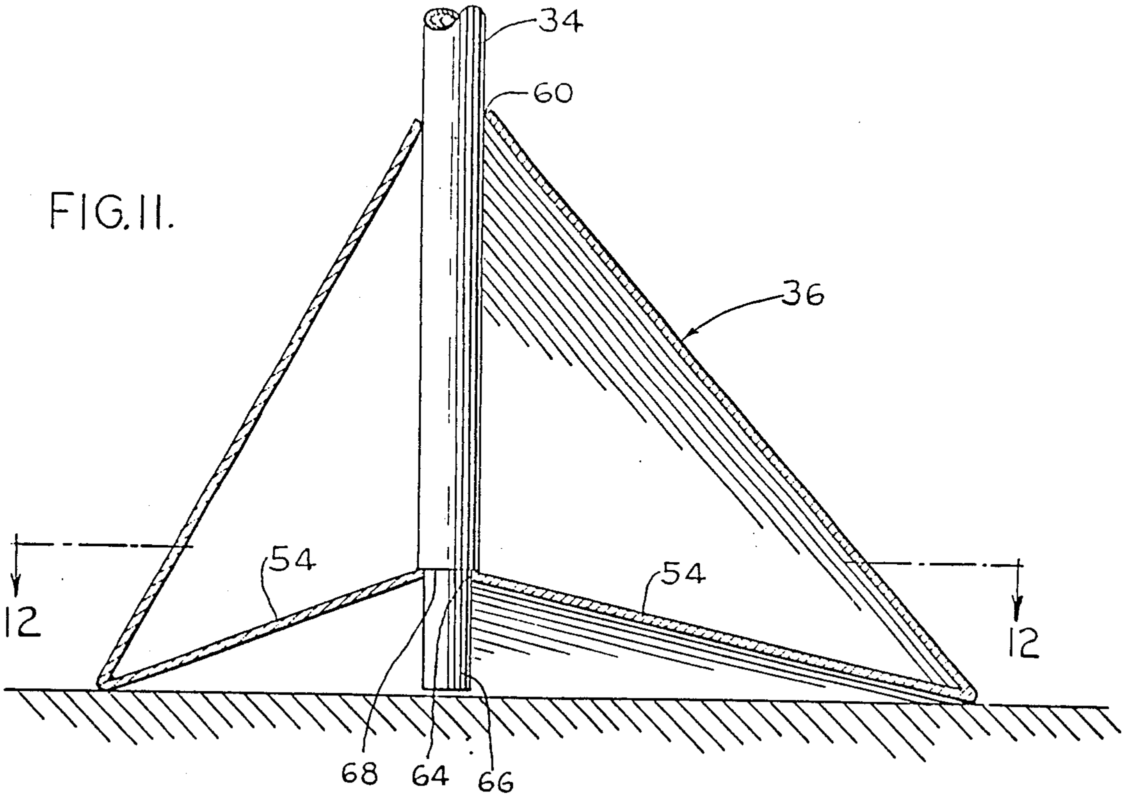
FIG. 11 is a cross-sectional view with portions removed taken along lines 11—11 of FIG. 2.

To construct the base 68, the bottom panels 55 are first folded inwardly. The flap 58 has previously been glued in place to the side it is to be affixed to. The bottom panels 54 are then folded down against the panels 55 as illustrated in FIG. 16. The panels 54 are then pushed down in the direction of the arrows B until the tabs 72 slide into their respective slots 74. This locks the entire base 68 into a rigid configuration with a bottom structure similar to the bottom structure of the base 36 as seen in FIG. 11. The centrally disposed hole 64 again receives in a locking relationship the bottom reduced diameter portion 66 of the pole 34.

It should be noted that by the addition of a score line 79 along one of the sides 51 of the polyhedral base 36, the entire base can be folded substantially flat when the bottom panels 54 are opened from their interwoven assembled configuration. The polyhedral base 68 does not require the addition of additional score lines to be folded flat after the bottom panels 54 and 55 are folded outwardly from their assembled position. Thus, either base is easily adapted for flat storage and transport. The pole 34 can be made from two separable pole elements which can be disassembled for ease in storage.

Figure 3:
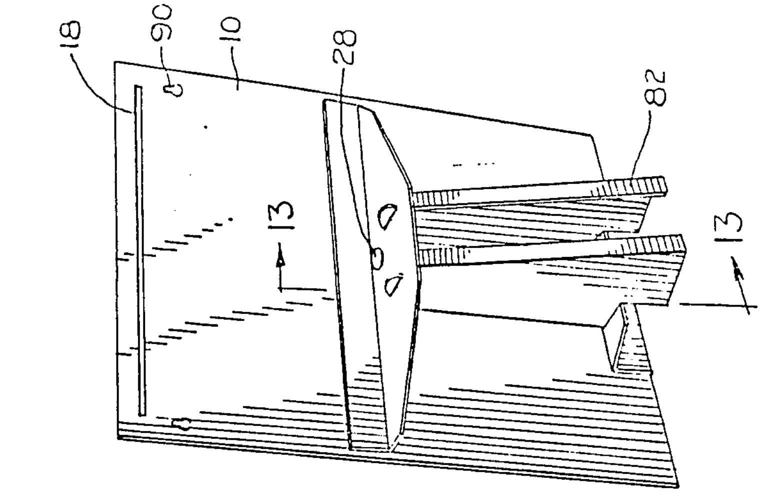
FIG. 3 is a rear perspective view of the display device in its second display mode suitable for display on a countertop or similar surface.
Figure 8:
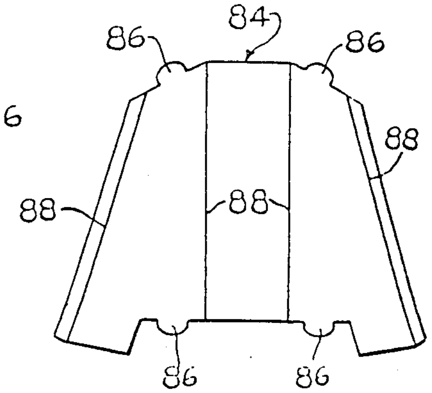
FIG. 8 is a plan view of the cardboard blank from which the bracket is formed.

In the second display mode, the display board 10 is supported on a display surface 80 which can be a countertop, desk top or other similar planar surface. A bracket 82 supports the frame 14 by being received by the L-shaped receiving brackets 20, 21. Particularly, the bracket 82 if formed from a blank 84 having tabs 86 extending outwardly (FIG. 8). These tabs 82 are received by the slots 30, 31, 32 and 33. The blank 84 is folded along its score lines 88 into the configuration shown in FIG. 3. Thus, the display board 10 is supported by means of the bracket 82, the entire structure resting on the display surface 80. The bracket 82 can be removed and folded flat for storage or transporting.

It can be seen that the back of the display board 10 has a pair of hook receiving holes 90 which can be used to mount the display board 10 against a wall having hooks thereon. This is easily accomplished as the L-shaped brackets 20, 21 are foldable flat against the back of the display board 10.

It is desirable that all of the components be manufactured from cardboard, paperboard, or other similar materials as they are light and inexpensive. Furthermore, they provide sufficient structural stability to accomplish the desired results.

Thus, it is apparent that there has been provided, in accordance with the invention, a collapsible display device that fully satisfies the objects, aims and advantages set forth above. The display device is capable of display in two or more configurations and is collapsible into a substantially flat configuration for storage and transport. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A display device which is collapsible for transportation and storage comprising:

a rectangular-shaped display board having a front side, a back side and formed from an integral sheet of material which is cut and scored to form along each edge thereof a foldable flap, each of said foldable flaps being folded atop said front side of said display board to form a frame about the periphery thereof, said frame forming a picture receiving slot between said frame and said front side of said display board into which a picture to be displayed is slidably received and retained, a pair of slots formed in each of said foldable flaps, a pair of locking tabs formed on at least two of said foldable flaps, each of said pair of slots on each of said foldable flaps being engaged with one of said pair of slots in the adjacent ones of said foldable flaps, each of said pair of locking tabs on said at least two foldable flaps being folded and lockingly engaged behind the adjacent ones of said foldable flaps and retaining all of said foldable flaps folded to form said frame, thereby permitting said frame to be formed without the necessity of adhesively or otherwise securing said foldable flaps to said display board, and complimentary finger apertures formed in said foldable flaps and said display board which when said foldable flaps are folded to form said frame form an aperture into which a finger can be extended to releasably disengage said locking tabs to thereby permit said foldable flaps to be reopened.

2. The display device of claim 1, further comprising a picture slot formed in said display board in communication with said picture receiving slot for receiving therethrough the picture to be displayed, whereby the picture can be easily removed and replaced with another picture.

3. The display device of claim 2, further comprising a pair of support receiving means affixed in a vertically spaced-apart relationship to the back side of said display board, each of said support receiving means having an aperture formed therein for receiving a pole and a pair of slots for receiving therein a pair of locking tabs; and a bracket formed from an integral sheet of material which is cut and scored to provide a central portion having opposite sides and a leg on each of said opposite sides of said central portion, locking tabs formed on each of said legs, said locking tabs lockingly engaging within said slots formed in said pair of support receiving means to secure said bracket to said display board, said legs of said bracket further being of a length to support said display board on a support surface in a substantially upright position when said bracket is affixed to said display board.

4. The display device of claim 3, further comprising a polyhedral base structure which is formed from an integral sheet of material which is cut and scored to form a plurality of side walls and a plurality of bottom panels which when folded interleave with each other to erect said base structure, said base structure having a centrally disposed opening at the top thereof and a centrally disposed hole in vertical alignment with said opening at the top thereof formed by said plurality of bottom panels; and a pole adapted to be received through both said opening at the top and said centrally disposed hole formed by said plurality of bottom panels of said base structure to support said pole in a vertical position, said pole further being received through said aperture in one of said pair of support receiving means and lockingly engaged in said aperture in the other one of said support receiving means to support said display board in a raised position above said base support, whereby said display board can be supported in a raised position by affixing said pole to said display board and vertically supporting said pole with said base structure, said display board, said bracket and said base structure all being collapsible for transportation and storage before and after assembly.

* * * * *